United States Patent
Lu et al.

(10) Patent No.: US 7,737,644 B2
(45) Date of Patent: Jun. 15, 2010

(54) BACKLIGHT CONTROL CIRCUIT WITH FEEDBACK CIRCUIT

(75) Inventors: Jian-Hui Lu, Shenzhen (CN); Tong Zhou, Shenzhen (CN); He-Kang Zhou, Shenzhen (CN)

(73) Assignees: Innocom Technology (ShenZhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 174 days.

(21) Appl. No.: 11/824,884

(22) Filed: Jul. 2, 2007

(65) Prior Publication Data
US 2008/0001555 A1    Jan. 3, 2008

(30) Foreign Application Priority Data
Jun. 30, 2006    (TW) .............................. 95123846 A

(51) Int. Cl.
*G05F 1/00*    (2006.01)
(52) U.S. Cl. .................... 315/307; 305/291; 305/308
(58) Field of Classification Search ................ 315/119, 315/291, 312
See application file for complete search history.

(56) References Cited

U.S. PATENT DOCUMENTS

| 6,008,591 A | * | 12/1999 | Huber et al. | 315/219 |
| 6,420,839 B1 | * | 7/2002 | Chiang et al. | 315/311 |
| 6,657,838 B2 | | 12/2003 | Min | |
| 6,703,796 B2 | * | 3/2004 | Che-Chen et al. | 315/291 |

FOREIGN PATENT DOCUMENTS

TW    M258540 Y    3/2005

* cited by examiner

*Primary Examiner*—Douglas W Owens
*Assistant Examiner*—Jianzi Chen
(74) *Attorney, Agent, or Firm*—Wei Te Chung

(57) ABSTRACT

An exemplary backlight control circuit (20) includes at least two sampling circuits (21), at least two feedback circuits (22), and a PWM IC (23). Each of the sampling circuits includes a sampling output (210) and a backlight lamp (211). The PWM IC includes a current sense pin (230). The at least two feedback circuits correspond to the at least two sampling circuits, respectively. Each of the feedback circuits includes a resistor (222) and a diode (223) electrically coupled in parallel. The sampling output is configured to output a first voltage when the backlight lamp is in a normal working state, and output a second voltage when the backlight lamp has an open circuit. One terminal of the diode is electrically coupled to the sampling output of a corresponding one of the sampling circuits, and an opposite terminal of the diode is electrically coupled to the current sense pin.

13 Claims, 3 Drawing Sheets

BACKLIGHT CONTROL CIRCUIT WITH FEEDBACK CIRCUIT

FIELD OF THE INVENTION

The present invention relates to a backlight control circuit with a feedback circuit, the backlight control circuit typically being used in a liquid crystal display (LCD).

GENERAL BACKGROUND

LCDs are widely used in various modern information products, such as notebooks, personal digital assistants (PDAs), video cameras and the like. The wide usage of the LCD is due to its advantages such as portability, low power consumption, and low radiation. Because liquid crystal in an LCD does not emit any light itself, a backlight system is usually needed to enable the LCD to display images.

A typical backlight system includes a plurality of backlight lamps, an inverter circuit for driving the backlight lamps, and a backlight control circuit. The backlight control circuit is for feeding back currents of the backlight lamps and protecting the backlight system when an open circuit occurs in any of the backlight lamps.

FIG. 3 is an abbreviated diagram of a conventional backlight control circuit 10. The backlight control circuit 10 is typically installed in a backlight system (not shown). The backlight system is used together with an LCD, both being installed in a product such as a notebook, a PDA, a video camera, etc. The backlight control circuit 10 includes four sampling circuits 11, a pulse width modulation integrated circuit (PWM IC) 13, a feedback circuit 12, and a protecting circuit 14.

Each sampling circuit 11 includes a sampling output 110, a backlight lamp 111, a first diode 113, a second diode 114, and a sampling resistor 115. One terminal of the backlight lamp 111 is electrically coupled to a positive terminal of the first diode 113, and electrically coupled to a negative terminal of the second diode 114. A negative terminal of the first diode 113 is grounded via the sampling resistor 115. A positive terminal of the second diode 114 is grounded directly. The other terminal of the backlight lamp 111 is electrically coupled to a backlight lamp 111 of an adjacent sampling circuit 11 via a respective coupling capacitor 116. Thus a first pair of the sampling circuits 11 are electrically coupled with each other via a first coupling capacitor 116, and a second pair of the sampling circuits 11 are electrically coupled with each other via a second coupling capacitor 116.

The PWM IC 13 includes a current sense pin 130 and a voltage output pin 131. The current sense pin 130 is grounded via an integrating capacitor 15. The voltage output pin 131 outputs a direct current (DC) voltage with a value of 5V. The PWM IC 13 controls the backlight system in which the backlight control circuit 10 is installed. In particular, the PWM IC 13 controls the backlight system to switch to a protecting state, if the current sense pin 130 has a low voltage.

The feedback circuit 12 includes a first feedback resistor 122 and a second feedback resistor 124. The first feedback resistor 122 is electrically coupled between the current sense pin 130 of the PWM IC 13 and one of the sampling outputs 110 of the first pair of sampling circuits 11. The second feedback resistor 124 is electrically coupled between the current sense pin 130 of the PWM IC 13 and one of the sampling outputs 110 of the second pair of sampling circuits 11.

The protecting circuit 14 includes an electronic switch 140, a first transistor 141, a second transistor 142, a third transistor 143, and a fourth transistor 144. Each one of the transistors 141, 142, 143, and 144 corresponds to a respective sampling circuit 11. The electronic switch 140 is an NMOS (negative-channel metal-oxide semiconductor) type transistor. A gate electrode of the electronic switch 140 is electrically coupled to the voltage output pin 131 via a bias resistor 146. A drain electrode of the electronic switch 140 is electrically coupled to the current sense pin 130. A source electrode of the electronic switch 140 is grounded. Gate electrodes of the four transistors 141, 142, 143, and 144 are respectively electrically coupled to the sampling outputs 110 of the sampling circuits 11 via respective third diodes 145. Each of these gate electrodes is also grounded via a respective resistor (not labeled) and a respective capacitor (not labeled) electrically coupled in parallel. A drain electrode of the first transistor 141 is electrically coupled to the electronic switch 140. A source electrode of the first transistor 141 is electrically coupled to a drain electrode of the second transistor 142. A source electrode of the second transistor 142 is electrically coupled to a drain electrode of the third transistor 143. A source electrode of the third transistor 143 is electrically coupled to a drain electrode of the fourth transistor 144. A source electrode of the fourth transistor 144 is grounded.

Operation of the backlight control circuit 10 is as follows. When the backlight lamps 111 of the sampling circuits 11 are in normal working states, the sampling outputs 110 provide high voltages to the gate electrodes of the corresponding transistors 141, 142, 143, and 144 via the third diodes 145. The high voltages cause the four transistors 141, 142, 143, and 144 to switch to on-states, and thereby lower the gate potential of the electronic switch 140. Thus, the electronic switch 140 is switched to an off-state. Moreover, the high voltages are converted to a feedback current by the feedback resistors 122 and 124. The PWM IC receives the feedback current via the current sense pin 130, and controls the driving voltages of the backlight lamps 111 according to the feedback current.

When an open circuit occurs in any backlight lamp 111, the corresponding sampling output 110 provides a low voltage. The low voltage causes the corresponding third diode 145 to switch to an off-state, which further causes the corresponding transistor 141, 142, 143, and 144 to switch to an off-state, respectively. The electronic switch 140 then switches to an on-state according to the DC voltage outputted from the voltage output pin 131. As a result, the current sense pin 130 of the PWM IC 13 is grounded via the electronic switch 140. Then the PWM IC 13 controls the backlight system to switch to a protecting state.

To carry out the function of protecting the backlight system, the backlight control circuit 10 needs at least five transistors 140, 141, 142, 143, and 144, four third diodes 145, and four sampling circuits 11 each including a first diode 113, a second diode 114, and a sampling resistor 115. Furthermore, if more than four backlight lamps 111 are used in the LCD, the number of transistors needed increases correspondingly. Thus, the cost of the backlight control circuit 10 is high, particularly in the case where there are a large number of backlight lamps 111.

It is, therefore, desired to provide a backlight control circuit that can be used to overcome the above-described deficiencies.

SUMMARY

In an exemplary embodiment, a backlight control circuit includes at least two sampling circuits, at least two feedback circuits, and a PWM IC. Each of the sampling circuits includes a sampling output and a first backlight lamp. The PWM IC includes a current sense pin. The at least two feedback circuits correspond to the at least two sampling circuits, respectively. Each of the feedback circuits includes a resistor and a diode electrically coupled in parallel. The sampling output is configured to output a first voltage when the first backlight lamp is in a normal working state, and output a second voltage when the first backlight lamp has an open circuit. One terminal of the diode is electrically coupled to the sampling output of a corresponding one of the sampling circuits, and an opposite terminal of the diode is electrically coupled to the current sense pin.

In another exemplary embodiment, a backlight control circuit includes a sampling circuit, a feedback circuit, and a PWM IC. The sampling circuit includes a sampling output and a first backlight lamp. The PWM IC includes a current sense pin. The feedback circuit includes a resistor. The sampling output is configured to output a first voltage when the first backlight lamp is in a normal working state, and output a second voltage when the first backlight lamp has an open circuit. The resistor is electrically coupled between the current sense pin of the PWM IC and the sampling output of the sampling circuit.

Other novel features and advantages of the above-described circuits will become more apparent from the following detailed description when taken in conjunction with the accompanying drawings.

DETAILED DESCRIPTION OF PREFERRED EMBODIMENTS

Reference will now be made to the drawings to describe preferred and exemplary embodiments of the present invention in detail.

Figure 1:
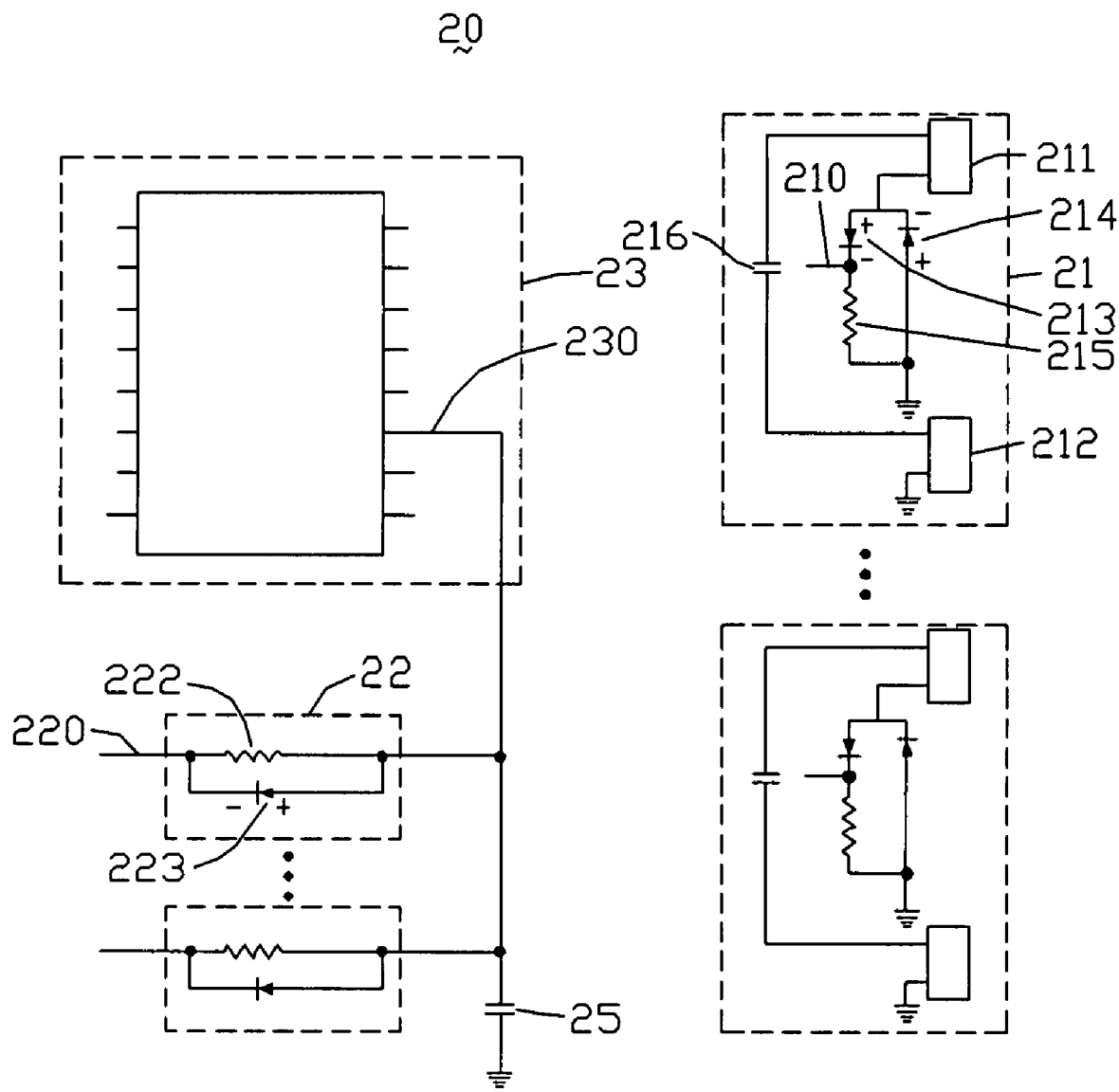
FIG. 1 is an abbreviated diagram of a backlight control circuit according to an exemplary embodiment of the present invention.

FIG. 1 is an abbreviated diagram of a backlight control circuit 20 according to an exemplary embodiment of the present invention. The backlight control circuit 20 is typically installed in a backlight system (not shown). The backlight system is used together with an LCD, both being installed in a product such as a notebook, a PDA, a video camera, etc. The backlight control circuit 20 includes at least two sampling circuits 21, at least two feedback circuits 22, and a pulse width modulation integrated circuit (PWM IC) 23. Each feedback circuit 22 corresponds to a respective sampling circuit 21. In the illustrated embodiment, only two sampling circuits 21 and two feedback circuits 22 are shown. For convenience, unless the context indicates otherwise, the following description relates to two sampling circuits 21 and two feedback circuits 22 only.

Each sampling circuit 21 includes a sampling output 210, a first backlight lamp 211, a second backlight lamp 212, a first diode 213, a second diode 214, a sampling resistor 215, and a coupling capacitor 216. The backlight lamps 211 and 212 can be cold cathode fluorescent lamps (CCFLs). One terminal of the second backlight lamp 212 is grounded. The other terminal of the second backlight lamp 212 is electrically coupled to a corresponding terminal of the first backlight lamp 211 via the coupling capacitor 216. The other terminal of the first backlight lamp 211 is electrically coupled to a positive terminal of the first diode 213, and electrically coupled to a negative terminal of the second diode 214. A negative terminal of the first diode 213 is grounded via the sampling resistor 215. A positive terminal of the second diode 214 is grounded directly. The sampling output 210 is electrically coupled to a node between the first diode 213 and the sampling resistor 215. The sampling output 210 provides a high voltage when the backlight lamps 211 and 212 are in normal working states, and provides a low voltage when one of the backlight lamps 211 and 212 has an open circuit.

The PWM IC 23 includes a current sense pin 230. The current sense pin 230 is grounded via an integrating capacitor 25. The PWM IC 23 controls the backlight system in which the backlight control circuit 20 is installed. In particular, the PWM IC 23 controls the backlight system to switch to a protecting state, if the current sense pin 230 has a low voltage. Further, the PWM IC 23 modulates the driving voltages of the backlight lamps 211 and 212 according to the feedback current received by the current sense pin 230, if the current sense pin 230 has a high voltage.

Each feedback circuit 22 includes an input 220, a feedback resistor 222, and a third diode 223. The input 220 is electrically coupled to the sampling output 210 of the corresponding sampling circuit 21. The feedback resistor 222 is electrically coupled between the input 220 and the current sense pin 230 of the PWM IC 23. A positive terminal of the diode 223 is electrically coupled to the current sense pin 230, and a negative terminal of the diode 223 is electrically coupled to the input 220.

Typically, breakdown voltages of the diodes 213, 214, and 223 need to be greater than 10V (volts). The diodes 213, 214, and 223 can, for example, be BAW56 type diodes. A capacitance of the integrating capacitor 25 is typically in the range from 0.11 nF (nanofarads) to 10 µF (microfarads), and preferably 22 nF. A capacitance of the coupling capacitor 216 is preferably 10 pF (picofarads). A resistance of each sampling resistor 215 is preferably 560Ω (ohms). A resistance of each feedback resistor 222 is typically in the range from 0.1KΩ to 1MΩ, and preferably 33KΩ. The PWM IC 250 can, for example, be an OZ9910G type PWM IC.

Typical operation of the backlight control circuit 20 is as follows. When the backlight lamps 211 and 212 of each sampling circuit 21 are in normal working states, the first diode 213 and the second diode 214 filter negative waves of the alternating current (AC) driving voltages of the backlight lamps 211 and 212. Due to the effect of the sampling resistors 215, the sampling outputs 210 of the sampling circuits 21 provide high voltages to the inputs 220 of the corresponding feedback circuits 22. The high voltages are converted to feedback currents by the feedback resistors 222. The feedback currents charge the integrating capacitor 25, and induce the current sense pin 230 to have another different high voltage. In each feedback circuit 22, a bias voltage is generated when the feedback current passes the feedback resistor 222, and this causes the third diode 223 to remain in an off-state. Then the PWM IC 23 receives the feedback currents through the current sense pin 230, and controls the driving voltages of the backlight lamps 211 and 212 according to the feedback currents.

When an open circuit occurs in any first backlight lamp 211, the sampling output 210 of the corresponding sampling circuit 21 provides a low voltage to the input 220 of the corresponding feedback circuit 22. At the same time, other sampling outputs 210 of the sampling circuits 21 without open circuits provide high voltages as normal, and output the high voltages to the current sense pin 230 of the PWM IC 23 via the corresponding feedback resistors 222. As a result, the positive terminal of the third diode 223 of the feedback circuit 22 corresponding to the sampling circuit 21 with the open circuit receives a high voltage, and the negative terminal of this third diode 223 receives a low voltage. Thereby, the third diode 223 switches to an on-state. Then the current sense pin 230 of the PWM IC 23 is pulled down to a low voltage by the on-state third diode 223. Accordingly, the PWM IC 23 controls the backlight system to switch to the protecting state.

Because each second backlight lamp 212 is electrically coupled to the corresponding first backlight lamp 211 via the corresponding coupling capacitor 216, when any second backlight lamp 212 has an open circuit, the current sense pin 230 of the PWM IC 23 is pulled down to a low voltage, and the backlight system is accordingly switched to the protecting state.

In the backlight control circuit 20, to carry out the function of protecting the backlight system and providing current feedback, each feedback circuit 22 needs only one feedback resistor 222 and one third diode 223. In addition, the function of sampling each two backlight lamps 211 and 212 needs only one sampling resistor 215 and two diodes 213 and 214. Therefore, the backlight control circuit 20 has a relatively simple structure and low cost.

Figure 2:
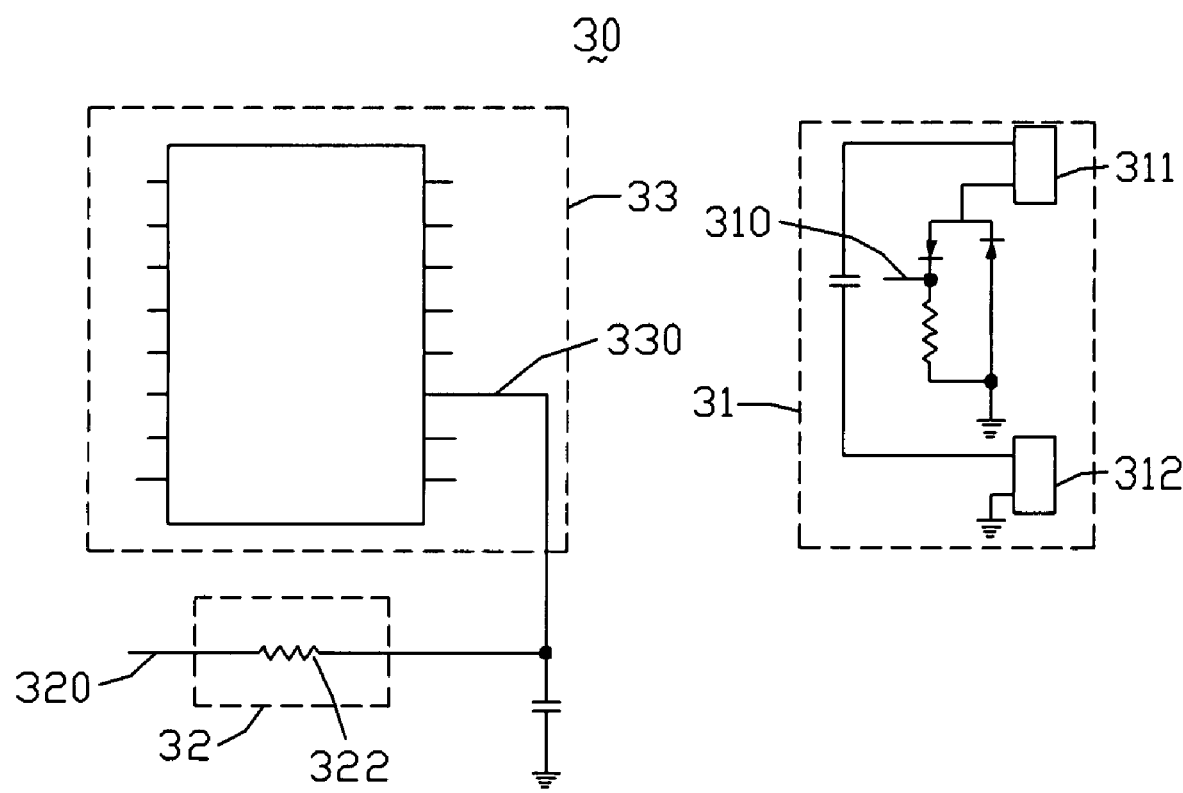
FIG. 2 is an abbreviated diagram of a backlight control circuit according to another exemplary embodiment of the present invention.
Figure 3:
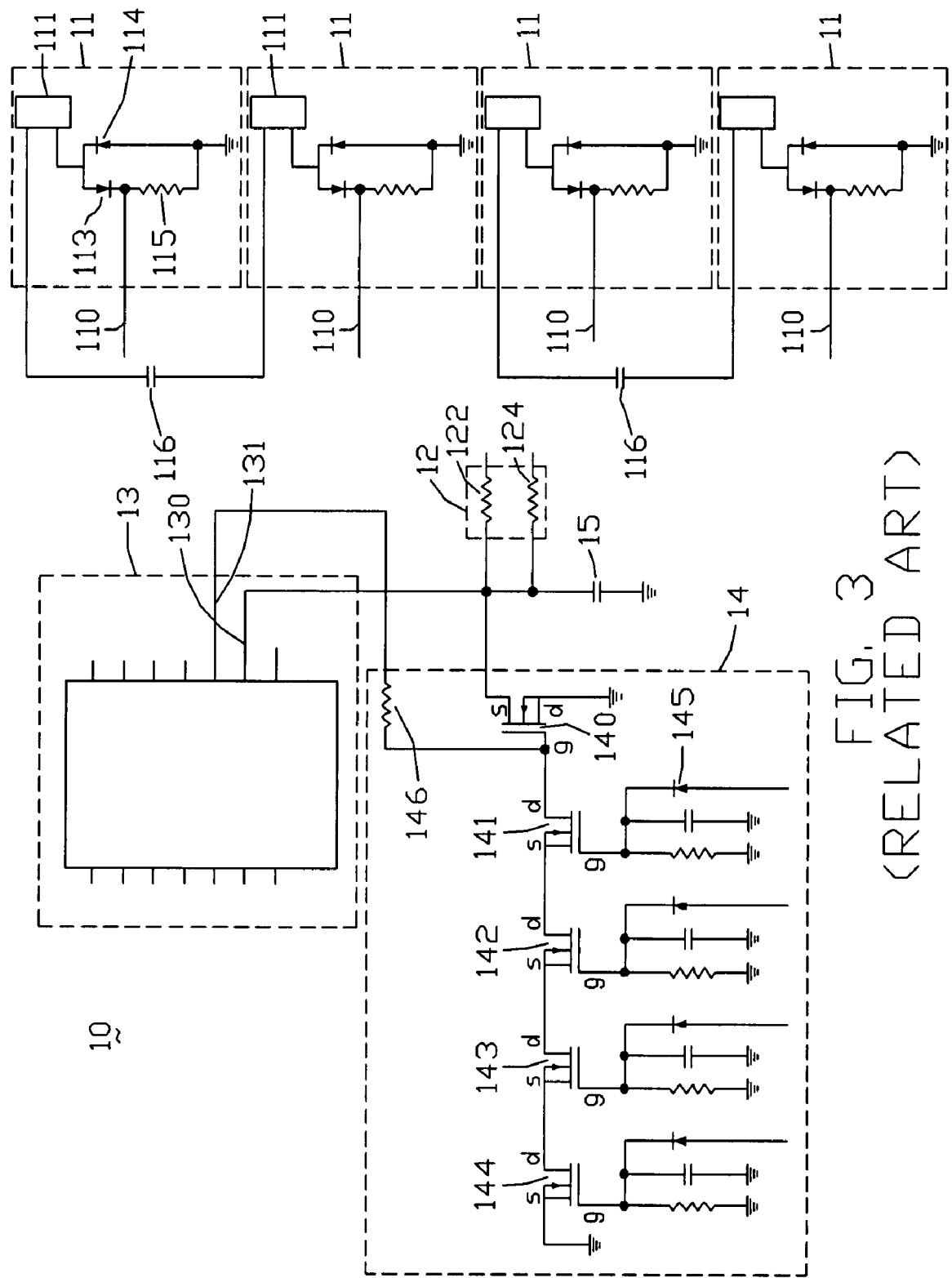
FIG. 3 is an abbreviated diagram of a conventional backlight control circuit.

FIG. 2 is an abbreviated diagram of a backlight control circuit 30 according to another exemplary embodiment of the present invention. The backlight control circuit 30 is similar to the above-described backlight control circuit 20. However, the backlight control circuit 30 includes a single sampling circuit 31 and a single feedback circuit 32. The sampling circuit 31 includes two backlight lamps 311 and 312, and a sampling output 310. The feedback circuit 32 includes an input 320 and a feedback resistor 322. The feedback resistor 322 is electrically coupled between a current sense pin 330 of a PWM IC 33 and the input 320. The input 320 of the feedback circuit 32 is electrically coupled to the sampling output 310 of the sampling circuit 31.

Typical operation of the backlight control circuit 30 is as follows. When the backlight lamps 311 and 312 of the sampling circuit 31 are in normal working states, the sampling output 310 provides a high voltage to the input 320 of the feedback circuit 32. The high voltage is converted to a feedback current by the feedback resistor 322. Then the PWM IC 33 receives the feedback current through the current sense pin 330, and controls the driving voltage of the backlight lamps 311 and 312 according to the feedback current.

When an open circuit occurs in either of the backlight lamps 311 and 312, the sampling output 310 of the sampling circuit 31 provides a low voltage to the input 320 of the feedback circuit 32. Then the low voltage is outputted to the current sense pin 330 of the PWM IC 33 via the feedback resistor 322. Thereby, the PWM IC 33 controls the backlight system to switch to a protecting state.

Moreover, in alternative embodiments of the backlight control circuits 20 and 30, each of the sampling circuits 21 and 31 can include one backlight lamp 211/212, 311/312 only. Taking the backlight control circuit 20 as an example, the second backlight lamp 212 in each sampling circuit 21 can be omitted, and the coupling capacitor 216 of the sampling circuit 21 can also be omitted.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of present invention to the full extent indicated by the broad general meaning of the terms in which the appended claims are expressed.

What is claimed is:

1. A backlight control circuit, comprising:
   at least two sampling circuits, each of the sampling circuits comprising a sampling output and a first backlight lamp, wherein the sampling output is configured to output a first voltage when the first backlight lamp is in a normal working state, and output a second voltage when the first backlight lamp has an open circuit;
   a pulse width modulation integrated circuit (PWM IC) comprising a current sense pin; and
   at least two feedback circuits corresponding to the at least two sampling circuits, respectively, each of the feedback circuits comprising a resistor and a diode electrically coupled in parallel, wherein one terminal of the diode is directly connected to the sampling output of a corresponding one of the sampling circuits, and an opposite terminal of the diode is directly connected to the current sense pin of the PWM IC.

2. The backlight control circuit as claimed in claim 1, wherein each of the sampling circuits further comprises a second backlight lamp, and the first and second backlight lamps of each of the sampling circuits are electrically coupled with each other.

3. The backlight control circuit as claimed in claim 2, wherein each of the sampling circuits further comprises a first diode and a sampling resistor, and in each of the sampling circuits, a positive terminal of the first diode is electrically coupled to the first backlight lamp, a negative terminal of the first diode is electrically coupled to the sampling output, and the negative terminal of the first diode is also grounded via the sampling resistor.

4. The backlight control circuit as claimed in claim 3, wherein each of the sampling circuits further comprises a second diode, and in each of the sampling circuits, a positive terminal of the second diode is grounded, and a negative terminal of the second diode is electrically coupled to the first backlight lamp.

5. The backlight control circuit as claimed in claim 4, wherein a breakdown voltage of the second diode of each of the sampling circuits is greater than 10V.

6. The backlight control circuit as claimed in claim 3, wherein a breakdown voltage of the first diode of each of the sampling circuits is greater than 10V.

7. The backlight control circuit as claimed in claim 2, wherein each of the sampling circuits further comprises a coupling capacitor, and in each of the sampling circuits, the first backlight lamp is electrically coupled to the second backlight lamp via the coupling capacitor.

8. The backlight control circuit as claimed in claim 1, further comprising an integrating capacitor, wherein the current sense pin of the PWM IC is grounded via the integrating capacitor.

9. The backlight control circuit as claimed in claim 8, wherein a capacitance of the integrating capacitor is in the range from 0.11 nF to 10 μF.

10. The backlight control circuit as claimed in claim 1, wherein the first voltage is a high voltage and the second voltage is a low voltage.

11. The backlight control circuit as claimed in claim 1, wherein said one terminal of the diode of each of the feedback circuits that is electrically coupled to the corresponding sampling output is a negative terminal, and said opposite terminal of the diode of each of the feedback circuits that is electrically coupled to the current sense pin of the PWM IC is a positive terminal.

12. The backlight control circuit as claimed in claim 1, wherein a resistance of the resistor of each of the feedback circuits is in the range from 0.1 KΩ to 1 MΩ.

13. The backlight control circuit as claimed in claim 1, wherein a breakdown voltage of the diode of each of the feedback circuits is greater than 10V.

* * * * *